(12) United States Patent
Givon

(10) Patent No.: US 9,218,126 B2
(45) Date of Patent: Dec. 22, 2015

(54) METHODS CIRCUITS APPARATUS AND SYSTEMS FOR HUMAN MACHINE INTERFACING WITH AN ELECTRONIC APPLIANCE

(75) Inventor: Dor Givon, Tel Aviv (IL)

(73) Assignee: EXTREME REALITY LTD., Herzliya Pituah (IL)

( * ) Notice: Subject to any disclaimer, the term of this patent is extended or adjusted under 35 U.S.C. 154(b) by 356 days.

(21) Appl. No.: 13/497,061

(22) PCT Filed: Sep. 21, 2010

(86) PCT No.: PCT/IL2010/000791
§ 371 (c)(1),
(2), (4) Date: Mar. 20, 2012

(87) PCT Pub. No.: WO2011/033519
PCT Pub. Date: Mar. 24, 2011

(65) Prior Publication Data
US 2012/0176414 A1    Jul. 12, 2012

Related U.S. Application Data

(60) Provisional application No. 61/244,136, filed on Sep. 21, 2009.

(51) Int. Cl.
*G09G 5/00* (2006.01)
*G06F 3/0488* (2013.01)

(52) U.S. Cl.
CPC .................................. *G06F 3/04886* (2013.01)

(58) Field of Classification Search
None
See application file for complete search history.

(56) References Cited

U.S. PATENT DOCUMENTS

| 4,376,950 | A | 3/1983 | Brown et al. |
| 5,130,794 | A | 7/1992 | Ritchey |
| 5,515,183 | A | 5/1996 | Hashimoto |
| 5,691,885 | A | 11/1997 | Ward et al. |
| 5,703,704 | A | 12/1997 | Nakagawa et al. |

(Continued)

FOREIGN PATENT DOCUMENTS

| EP | 1 115254 | 7/2001 |
| JP | 10-040418 | 2/1998 |

(Continued)

OTHER PUBLICATIONS

Carranza et al., "Free-Viewpoint Video of 1-39 Human Actors", Proc. of ACM SIGGRAPH 2003, Jul. 27, 2003.

(Continued)

*Primary Examiner* — Stephen R Koziol
*Assistant Examiner* — Khoa Vu
(74) *Attorney, Agent, or Firm* — Vladimir Sherman

(57) ABSTRACT

Disclosed are methods, circuits, apparatus and systems for human machine interfacing with a computational platform or any other electronic device, such as a cell-phone, smart-phone, e-book, notebook computer, tablet computer, etc. According to some embodiments, there may be provided an adaptive touch-screen input arrangement, such as a keyboard, keypad or any other touch screen input arrangements including one or more input elements such as rendered or projected keys or buttons which may be projected onto or rendered on a touch screen display. The adaptive touch-screen input arrangement may be adapted to alter the size, shape or location of input elements within proximity of a finger, limb or implement used by a user to touch the screen.

4 Claims, 1 Drawing Sheet

(56) References Cited

U.S. PATENT DOCUMENTS

| | | |
|---|---|---|
| 5,745,719 A | 4/1998 | Falcon |
| 5,831,633 A | 11/1998 | Van Roy |
| 5,835,133 A | 11/1998 | Moreton et al. |
| 5,852,450 A | 12/1998 | Thingvold |
| 5,909,218 A | 6/1999 | Naka et al. |
| 6,115,482 A | 9/2000 | Sears et al. |
| 6,243,106 B1 | 6/2001 | Rehg et al. |
| 6,303,924 B1 | 10/2001 | Adan et al. |
| 6,317,130 B1 | 11/2001 | Ishikawa et al. |
| 6,388,670 B2 | 5/2002 | Naka et al. |
| 6,529,643 B1 | 3/2003 | Loce et al. |
| 6,545,663 B1 | 4/2003 | Arbter et al. |
| 6,554,706 B2 | 4/2003 | Kim et al. |
| 6,597,801 B1 | 7/2003 | Cham et al. |
| 6,657,670 B1 | 12/2003 | Cheng |
| 6,674,877 B1 | 1/2004 | Jojic et al. |
| 6,681,031 B2 | 1/2004 | Cohen et al. |
| 6,833,843 B2 | 12/2004 | Mojaver et al. |
| 6,906,687 B2 | 6/2005 | Werner |
| 7,061,492 B2 | 6/2006 | Carrai et al. |
| 7,061,532 B2 | 6/2006 | Silverstein |
| 7,116,330 B2 | 10/2006 | Marshall et al. |
| 7,123,292 B1 | 10/2006 | Seeger et al. |
| 7,184,589 B2 | 2/2007 | Okubo |
| 7,257,237 B1 | 8/2007 | Luck et al. |
| 7,308,112 B2 | 12/2007 | Fujimura et al. |
| 7,366,278 B2 | 4/2008 | Fu et al. |
| 7,429,997 B2 | 9/2008 | Givon |
| 7,755,608 B2 | 7/2010 | Chang et al. |
| 7,783,118 B2 | 8/2010 | Zhou |
| 7,885,480 B2 | 2/2011 | Bryll et al. |
| 7,903,141 B1 | 3/2011 | Mariano et al. |
| 7,936,932 B2 | 5/2011 | Bashyam et al. |
| 7,978,917 B2 | 7/2011 | Lei et al. |
| 8,005,263 B2 | 8/2011 | Fujimura et al. |
| 8,036,494 B2 | 10/2011 | Chen |
| 8,094,873 B2 | 1/2012 | Kelusky et al. |
| 8,094,943 B2 | 1/2012 | Eaton et al. |
| 8,107,726 B2 | 1/2012 | Xu et al. |
| 8,111,284 B1 | 2/2012 | Givon |
| 8,114,172 B2 | 2/2012 | Givon |
| 8,237,775 B2 | 8/2012 | Givon |
| 8,432,390 B2 | 4/2013 | Givon |
| 8,462,199 B2 | 6/2013 | Givon |
| 2001/0007452 A1 | 7/2001 | Naka et al. |
| 2002/0191239 A1 | 12/2002 | Psaltis et al. |
| 2003/0007680 A1 | 1/2003 | Iijima et al. |
| 2004/0155962 A1 | 8/2004 | Marks |
| 2004/0161133 A1 | 8/2004 | Elazar et al. |
| 2004/0193413 A1 | 9/2004 | Wilson et al. |
| 2004/0228530 A1 | 11/2004 | Schwartz |
| 2005/0023448 A1 | 2/2005 | Ogawara et al. |
| 2005/0041842 A1 | 2/2005 | Frakes et al. |
| 2005/0063596 A1 | 3/2005 | Yomdin et al. |
| 2005/0166163 A1 | 7/2005 | Chang et al. |
| 2005/0232514 A1 | 10/2005 | Chen |
| 2005/0259870 A1 | 11/2005 | Kondo et al. |
| 2005/0271279 A1 | 12/2005 | Fujimura et al. |
| 2006/0010400 A1 | 1/2006 | Dehlin et al. |
| 2006/0056679 A1 | 3/2006 | Redert et al. |
| 2006/0104480 A1 | 5/2006 | Fleisher |
| 2006/0148527 A1* | 7/2006 | Blount ............... 455/566 |
| 2006/0161870 A1* | 7/2006 | Hotelling et al. ........... 715/863 |
| 2006/0164230 A1 | 7/2006 | DeWind et al. |
| 2006/0187305 A1 | 8/2006 | Trivedi et al. |
| 2006/0294509 A1 | 12/2006 | Mital et al. |
| 2007/0012349 A1* | 1/2007 | Gaudiana et al. ........... 136/244 |
| 2007/0098250 A1 | 5/2007 | Molgaard et al. |
| 2007/0183633 A1 | 8/2007 | Hoffmann |
| 2007/0183663 A1 | 8/2007 | Wang et al. |
| 2007/0236475 A1 | 10/2007 | Wherry |
| 2007/0259717 A1 | 11/2007 | Mattice et al. |
| 2007/0285419 A1 | 12/2007 | Givon |
| 2007/0285554 A1 | 12/2007 | Givon |
| 2008/0007533 A1 | 1/2008 | Hotelling |
| 2008/0013793 A1 | 1/2008 | Hillis et al. |
| 2008/0030460 A1 | 2/2008 | Hildreth et al. |
| 2008/0036732 A1 | 2/2008 | Wilson et al. |
| 2008/0037829 A1 | 2/2008 | Givon |
| 2008/0037869 A1 | 2/2008 | Zhou |
| 2008/0100572 A1* | 5/2008 | Boillot ............... 345/158 |
| 2008/0101722 A1 | 5/2008 | Bryll et al. |
| 2008/0104547 A1 | 5/2008 | Morita et al. |
| 2008/0111710 A1 | 5/2008 | Boillot |
| 2008/0143975 A1 | 6/2008 | Dennard et al. |
| 2008/0148149 A1 | 6/2008 | Singh et al. |
| 2008/0181499 A1 | 7/2008 | Yang et al. |
| 2008/0284726 A1* | 11/2008 | Boillot ............... 345/156 |
| 2009/0058833 A1 | 3/2009 | Newton |
| 2009/0062696 A1 | 3/2009 | Nathan et al. |
| 2009/0080715 A1 | 3/2009 | Van Beek et al. |
| 2009/0116732 A1 | 5/2009 | Zhou et al. |
| 2009/0141987 A1 | 6/2009 | McGarry et al. |
| 2010/0005427 A1* | 1/2010 | Zhang et al. ............... 715/863 |
| 2010/0066735 A1 | 3/2010 | Givon |
| 2010/0111370 A1 | 5/2010 | Black et al. |
| 2010/0141802 A1 | 6/2010 | Knight et al. |
| 2010/0194862 A1 | 8/2010 | Givon |
| 2010/0208038 A1 | 8/2010 | Kutliroff et al. |
| 2010/0295799 A1* | 11/2010 | Nicholson et al. ........... 345/173 |
| 2010/0303290 A1 | 12/2010 | Mathe |
| 2010/0328351 A1 | 12/2010 | Tan |
| 2011/0045812 A1* | 2/2011 | Kim et al. ............... 455/418 |
| 2011/0052068 A1 | 3/2011 | Cobb et al. |
| 2011/0069152 A1 | 3/2011 | Wang et al. |
| 2011/0080496 A1 | 4/2011 | Givon |
| 2011/0129124 A1 | 6/2011 | Givon |
| 2011/0163948 A1 | 7/2011 | Givon et al. |
| 2011/0286673 A1 | 11/2011 | Givon et al. |
| 2011/0292036 A1 | 12/2011 | Sali et al. |
| 2012/0176414 A1 | 7/2012 | Givon |
| 2012/0176477 A1 | 7/2012 | Givon |
| 2012/0218183 A1 | 8/2012 | Givon et al. |
| 2013/0120319 A1 | 5/2013 | Givon |

FOREIGN PATENT DOCUMENTS

| | | |
|---|---|---|
| JP | 2001-246161 | 9/2001 |
| JP | 2002-216146 | 8/2002 |
| JP | 2004-062692 | 2/2004 |
| JP | 2006-040271 | 2/2006 |
| JP | 2007-531113 | 1/2007 |
| JP | 2007-302223 | 11/2007 |
| WO | WO 03/025859 | 3/2003 |
| WO | WO 03/039698 | 5/2003 |
| WO | WO 2004/013814 | 2/2004 |
| WO | WO 2004/094943 | 11/2004 |
| WO | WO 2005/114556 | 12/2005 |
| WO | WO 2006/011153 | 2/2006 |
| WO | WO 2006/099597 | 9/2006 |
| WO | WO 2008/126069 | 10/2008 |
| WO | WO 2011/033519 | 3/2011 |
| WO | WO 2013/069023 | 5/2013 |

OTHER PUBLICATIONS

Cheung G K M et al.,"Shape-from-silhouette of articulated objects and its use for human body kinematics estimation and motion capture", Proceedings / 2003 IEEE Computer Society Conference on Computer Vision and Pattern Recognition, Jun. 18-20, 2003, Madison, Wisconsin.

Starck et al., "Model-based multiple view reconstruction of people", Proceedings of the Eight IEEE International Conference on Computer Vision. (ICCV). Nice, France, Oct. 13-16, 2003.

Molet T et al: "An animation interface designed for motion capture", Computer Animation '97 Geneva, Switzerland Jun. 5-6, 1997.

Kronrod B et al., "Optimized triangle mesh compression using prediction trees", Computer Graphics and Applications, 2000. Proceedings. the Eighth Pacific Conference on Hong Kong, China Oct. 3-5, 2000.

Theobalt C et al.,: "Enhancing silhouette-based human motion capture with 3D motion fields", Computer Graphics and Applications,

(56) References Cited

OTHER PUBLICATIONS

2003. Proceedings. 11th Pacific Conference on Oct. 8-10, 2003, Piscataway, NJ, USA, IEEE, Oct. 8, 2003.
Bregler C et al: "Tracking people with twists and exponential maps", Computer Vision and Pattern Recognition, 1998. Proceedings. 1998 IEEE Computer Society Conference on Santa Barbara, CA, USA Jun. 23-25, 1998, Los Alamitos, CA,USA,IEEE Comput. Soc, US, Jun. 23, 1998, pp. 8-15, XP010291718.
Sminchisescu et al. "Estimated Articulated Human Motion with Covariance Scaled Sampling". Published 2003.
Sappa et al. "Monocular 3D Human Body Reconstruction toward Depth Augmentation of Television Sequences". Published 2003.
Sminchisescu et al. "Human Pose Estimation from Silhouettes a Consistent Approach Using Distance Level Set". Published 2002.
Sminchisescu C et al: "Kinematic jump processes for monocular 3D human tracking", Proceedings / 2003 IEEE Computer Society Conference on Computer Vision and Pattern Recognition, Jun. 18-20, 2003, Madison, Wisconsin; [Proceedings of the IEEE Computer Conference on Computer Vision and Pattern Recognition], Los Alamitos, Calif. [U.A, vol. 1, Jun. 18, 2003, pp. 69-76, XP010644883, DOI: 10.1109/CVPR.2003.1211339 ISBN: 978-0-7695-1900-5.
Ren Ng, "Digital Light Field Photography", Jul. 2006, (available at www.lytro.com/rennig-thesis.pdf).
D'Apuzzo N et al: "Modeling human bodies from video sequences", SPIE Proceedings, The International Society for Optical Engineering—SPIE, Bellingham, Washington, USA, vol. 3641, Jan. 1, 1998, pp. 36-47, XP002597223, ISSN: 0277-786X, DOI: 10.1117/12.333796.

\* cited by examiner

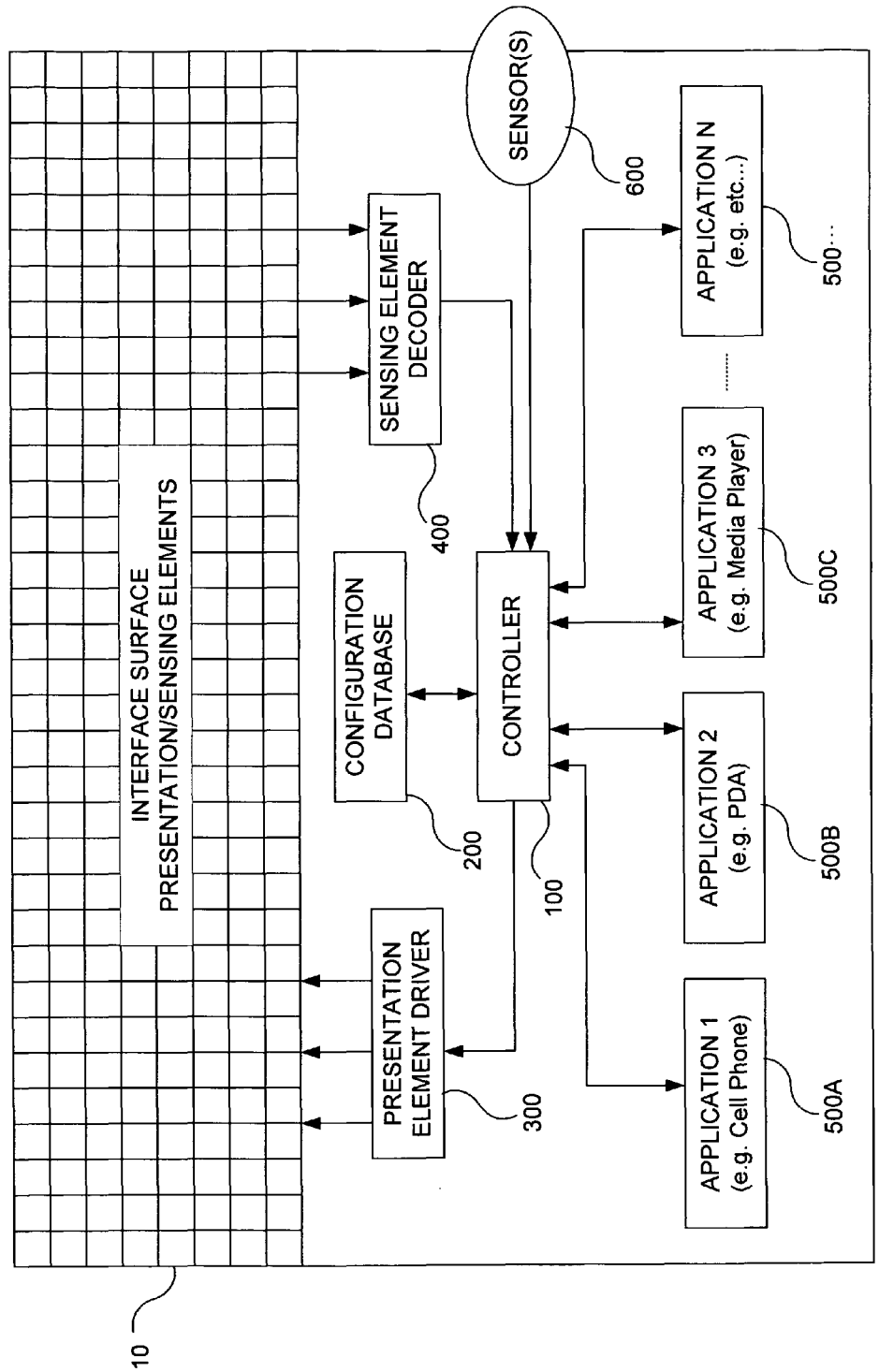

METHODS CIRCUITS APPARATUS AND SYSTEMS FOR HUMAN MACHINE INTERFACING WITH AN ELECTRONIC APPLIANCE

FIELD OF THE INVENTION

The present invention generally relates to the field of electronics. More specifically, the present invention relates to a methods, circuits, apparatus and systems for facilitating human interface with electronic devices such as mobile devices, cell phones, Personal Digital Assistants ("PDA"), digital cameras, or any integrated combination of electronic devices.

BACKGROUND

In recent decades, electronic technology, including communication technology, has revolutionized our everyday lives. Electronic devices such as PDA's, cell phones, e-books, notebook computers, mobile media players and digital cameras have permeated the lives of almost every person living in the developed world—and quite a number of people living in undeveloped countries. Mobile communication and computing devices especially, have become the means by which countless millions conduct their personal and professional interactions with the world. It has become almost impossible for many people, especially those in the business world, who use these devices as a means to improve productivity, to function without access to their electronic devices.

With this tremendous proliferation in the use of electronic devices, however, there has developed a tradeoff between enhanced productivity and simplicity or convenience. As handheld devices evolved to perform more and more tasks, the complexity of the interfaces required to interact which these devices has likewise increased. Many of today's handheld devices come equipped with some variation or another of a full typewriter keyboard. Some devices have fixed keyboards which are electromechanical in nature, while others project a keyboard, a key pad or some variation of either onto a display associated with a touch screen sensor array. Because of the need to keep mobile or handheld devices compact enough to carry around, many of the physical buttons and/or virtual keys (i.e. projected keyboards and keypads) implemented on these devices have keys or other interface components which are quite small relative to an average human finger, thus difficult to operate.

Thus, there is a need for improved methods, circuits, apparatus and systems for interfacing with an electronic device.

SUMMARY OF THE INVENTION

According to embodiments of the present invention, there are provided methods, circuits, apparatus and systems for human machine interfacing with a computational platform or any other electronic device, such as a cell-phone, smart-phone, e-book, notebook computer, tablet computer, etc. According to some embodiments of the present invention, there may be provided an adaptive touch-screen input arrangement, such as a keyboard, keypad or any other touch screen input arrangement including one or more input elements, such as rendered or projected keys or buttons which may be projected onto or rendered on a touch screen display. The adaptive touch-screen input arrangement may be adapted to alter the size, shape or location of input elements within proximity of a finger, limb or implement used by a user to touch the screen.

According to some embodiment of the present invention, one or more sensors, such as: (1) image sensors, (2) image sensor arrays, (3) electrostatic sensors, (4) capacitive sensors, or (5) any other functionally suited sensor may sense a location and/or motion vector of a finger, limb or implement approaching the touch screen. The sensor(s) may provide to the adaptive touch screen-input arrangement an indication of the sensed position or motion vector of the finger/limb/implement relative to the input elements or keys—thereby indicating which input elements or keys are being approached. In response to the indication, the touch screen input arrangement may alter the size, shape or location of input elements within proximity of the sensed finger, limb or implement in order to make them more prominent (e.g. larger or in a better location) and more easily engagable.

According to further embodiments of the present invention, there may be provided a human interface surface (e.g. touch screen display) comprising presentation and sensing elements. The presentation elements and the sensing elements may be integrated into a single substrate material or may be part of separate substrates which are mechanically attached to one another in an overlapping manner. According to further embodiments of the present invention, there may be provided a controller (e.g. display drive circuit) adapted to send one or more presentation signals to the presentation elements of the human interface surface based, at least partially, on data stored in a presentation configuration table (e.g. virtual keyboard layout including location and size of keys) and based on a current state of the device. The current state of the device may be determined based on one or more signals received from the sensing elements and/or based on one or more signals received from the device.

According to further embodiments of the present invention, the controller may associate a function or device command signal with each of one or more signals received from the sensing elements (e.g. when the sensing element is touched), wherein the association of a command or function may be at least partially based on data from a first data set in the sensing element configuration table. The data selected from the sensing element configuration table may be correlated to data from the presentation configuration used by the controller to send one or more signals to the presentation elements.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1 shows a block diagram of an exemplary mobile device according to some embodiments of the present invention, including an interface surface and various electric functional blocks to drive the interface surface.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

According to embodiments, there may be provided an interface apparatus for an electronic device including an adaptive touch-screen input arrangement adapted to alter a size, position or shape of an input element based on a signal or an indication from a touchless sensor regarding a position or motion vector of a finger, limb or implement. The adaptive touch-screen input arrangement may include a display functionally associated with a graphics processing circuit adapted to render one or more input elements and to project the one or more elements on the display. The apparatus may include a touchless sensor adapted to sense a position or motion vector of a finger, limb or implement in proximity with said display. A signal derived from an output of the touchless sensor may be provided to the graphics processing circuit and may cause the graphics processing circuit to alter a feature of one or more projected interface elements—for example the size of an input element (e.g. a keyboard key projected on the display and its associated touch-screen sensor area) in proximity with a position of a finger, limb or implement may be enlarged. The touchless sensor may be selected from a group of sensors consisting of (1) proximity sensors, (2) image sensors, (3) image sensor arrays, (4) electrostatic sensors, and (5) capacitive sensors. The interface apparatus may be part of a computing device, communication device or any other electronic device known today or to be developed in the future.

Turning now to FIG. 1, there is shown a block diagram of an exemplary mobile device, according to some embodiments of the present invention, including an interface surface and various electric functional blocks to drive and interact with the interface surface or touch-screen assembly. The exemplary device may include a controller 100 adapted to regulate signals to a presentation element driver 300, which presentation element driver 300 may be functionally associated with presentation elements (e.g. Light Emitting Diodes, LCD, etc.) of an interface surface 10. The controller may also be adapted to receive signals from a touch sensing element decoder 400, which decoder 400 is functionally associated with touch sensing elements (e.g. touch sensors, etc.) of the interface surface. The controller may also be adapted to receive finger/limb/implement location or motion indications or information from a touchless sensor 600.

It should be understood that the controller 100 may be a processor, a graphics processor, dedicated control logic or any combination thereof.

A configuration database 200 may include information used by the controller 100 in regulating signal flow to the presentation element driver. As shown in FIG. 1, the configuration database 200 may include such information as interface elements (e.g. buttons or display area) shape and location, display properties, etc., for each of the applications 500A through 500N installed on the device. It should be understood by one of ordinary skill in the art that interface elements such as buttons and displays mentioned above are not physical buttons or displays, but rather virtual elements projected through the presentation surface 10. For each given application 500A through 500N, the configuration database 200 may also include sensing element mapping information corresponding to presentation information/elements associated with given application to specific functions. The controller 100 may use the mapping information to determine which interface element is interacted with (when the screen is touched) by the user and which function/command that interaction is meant to trigger.

The controller may be adapted to alter the size, shape, location or any other feature of any element projected/rendered by the display elements based on a signal or indication provided by the touchless sensor 600 regarding finger/limb/implement location or motion relative to the sensing surface or any of the elements projected onto the sensing surface. The controller may make an input element towards which the finger/limb/implement is approaching more prominent. The controller may also adjust its touch-sensor element to function mapping to correlate with the adjusted projected/displayed input element size, shape or location.

According to some embodiments of the present invention, the touchless sensor 600 may be adapted to determine the position and/or motion of a finger/limb/implement relative to the touch-screen or relative to elements projected/rendered/displayed thereon. The touchless sensor may be part of an image based human machine interface. The image based human machine interface may include one or more image sensors and software running on the controller, on another generable purpose processor or on a dedicated processor. According to further embodiments of the present invention, the sensor 600 may be part of electrostatic sensing arrangement. It should be understood by one of skill in the art that any functionally correlated (i.e. can serve the same function) touchless sensor may be used as part of some embodiments of the present invention.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed:

1. A user interface apparatus, comprising:
    a touch-screen input arrangement including a touchscreen and graphics processing circuitry adapted to render touch activated user input elements on said touchscreen, wherein a touch activated user input element is a control element having an associated function triggered by the user physically touching a point on the touchscreen where the element is rendered;
    one or more image sensors adapted to sense a position or motion vector, relative to said touch activated user input elements, of a user finger, limb or control implement approaching said touch-screen; and
    mapping information correlating locations of the rendered touch activated user input elements to functions of applications;
    processing circuitry adapted to determine a given rendered touch activated input element the user finger, limb or control implement is approaching, based on the position or motion vector sensed by said one or more image sensors;
    a controller adapted to: (1) cause said graphics processing circuitry to facilitate interaction with said given rendered touch activated input element by altering a size shape or location of said given rendered touch activated input element towards the finger, limb or implement, and (2) modify the mapping information to account for the altered size, shape or location of the given rendered touch activated input element.

2. An electronic device, comprising:
    a processor;
    a battery;
    a touch-screen input arrangement including a touchscreen and graphics processing circuitry adapted to render touch activated user input elements on said touchscreen, wherein a touch activated user input element is a control element having an associated function triggered by the user physically touching a point on the touchscreen where the element is rendered;
    a touchless sensor adapted to sense a motion vector, relative to said touch activated user input elements, of a user finger, limb or control implement approaching said touch-screen; and
    a controller adapted to: (1) receive from said touchless sensor the motion vector of the user finger, limb or control implement, (2) determine a given rendered touch activated input element the received motion vector is directed towards, and (3) cause said graphics processing circuitry to facilitate interaction with said given rendered touch activated input element by altering a location, size, position or shape of said given rendered touch activated input element;
    wherein altering the given touch activated input element includes enlarging the given input element.

3. The device according to claim 2, wherein said touchless sensor is selected from the group of sensors consisting of (1) proximity sensors, (2) image sensors, (3) image sensor arrays, (4) electrostatic sensors, and (5) capacitive sensors.

4. A method for human-machine interfacing, said method comprising;
    providing, upon a touchscreen, a graphic user interface including touch activated user input elements, wherein a touch activated user input element is a control element having an associated function triggered by the user physically touching a point on the touchscreen where the element is rendered;
    determining, by use of one or more image sensors, a motion vector, relative to the touch activated user input elements, of a user finger, limb or control implement approaching the touch-screen input arrangement;
    determining, based on the determination of a motion vector of a user finger, limb or implement, a given rendered touch activated input element the motion vector is directed towards;
    facilitate interaction with the given rendered touch activated input element by altering a location, size, position or shape of the given rendered touch activated input element;
    wherein altering the given touch activated input element includes enlarging the given input element.

* * * * *